(12) United States Patent
Michel

(10) Patent No.: US 8,001,754 B2
(45) Date of Patent: Aug. 23, 2011

(54) HEIGHT ADJUSTER MECHANISM FOR A GRASS/GROUND TREATMENT MACHINE

(76) Inventor: David Michel, Leeds (GB)

(*) Notice: Subject to any disclaimer, the term of this patent is extended or adjusted under 35 U.S.C. 154(b) by 297 days.

(21) Appl. No.: 12/161,919

(22) PCT Filed: Jan. 24, 2007

(86) PCT No.: PCT/GB2007/000234
§ 371 (c)(1),
(2), (4) Date: Aug. 19, 2008

(87) PCT Pub. No.: WO2007/085820
PCT Pub. Date: Aug. 2, 2007

(65) Prior Publication Data
US 2009/0007536 A1    Jan. 8, 2009

(30) Foreign Application Priority Data

Jan. 24, 2006 (GB) .................................. 0601355.1

(51) Int. Cl.
*A01D 34/00* (2006.01)
(52) U.S. Cl. .......................................... 56/17.2; 56/15.2
(58) Field of Classification Search ............... 56/7, 15.2, 56/16.7, 17.1, 17.2, 198, 249, 294, 320.1
See application file for complete search history.

(56) References Cited

U.S. PATENT DOCUMENTS

| | | | | |
|---|---|---|---|---|
| 1,802,304 A * | 4/1931 | Anderson | ........................ | 56/294 |
| 1,957,756 A * | 5/1934 | Campbell | ........................ | 56/294 |
| 2,197,295 A * | 4/1940 | Cambridge | ...................... | 56/294 |
| 2,287,126 A * | 6/1942 | Packwood | ...................... | 56/16.7 |
| 2,365,338 A * | 12/1944 | Godwin | ........................ | 56/294 |
| 2,681,538 A * | 6/1954 | Flansaas | ...................... | 56/320.1 |
| 2,776,844 A | 1/1957 | Wilkin | | |
| 2,825,196 A * | 3/1958 | Gudmundsen | ................. | 56/13.6 |
| 2,926,926 A * | 3/1960 | Rowe et al. | ................... | 280/43.2 |
| 3,099,124 A * | 7/1963 | Strasel | ............................ | 56/249 |
| 3,106,813 A * | 10/1963 | Strasel | ............................ | 56/249 |
| 3,114,229 A * | 12/1963 | Wilson | ........................... | 56/11.8 |
| 3,161,006 A * | 12/1964 | Willette et al. | ................. | 56/17.2 |
| 3,217,479 A * | 11/1965 | Robinson et al. | ............... | 56/254 |
| 3,423,919 A * | 1/1969 | Cook | ............................. | 56/249 |
| 3,445,991 A * | 5/1969 | Deptula et al. | ................. | 56/11.8 |

(Continued)

FOREIGN PATENT DOCUMENTS

CA    1201598    3/1986

(Continued)

*Primary Examiner* — Thomas Will
*Assistant Examiner* — Joan D Misa
(74) *Attorney, Agent, or Firm* — Kirton & McConkie; Evan R. Witt

(57) ABSTRACT

A height adjuster mechanism for mounting on a frame of a grass and/or ground treatment machine to vary the height of the frame relative to a ground-engaging roller assembly and thereby adjust the height setting of a grass and/or ground treatment module mounted on the frame. The mechanism includes an open-topped housing provided on a rotary adjuster and having an upper surface which defines a height adjustment reference datum level. An insert is movable up and down within the open-topped housing in which the upper surface of the insert can be adjusted to be substantially flush or coplanar with the upper surface of the open-topped housing so as to set a datum level of the treatment module. Means are provided for determining the extent of angular adjustment of the rotary adjuster so as to set any required height adjustment of the treatment module.

8 Claims, 2 Drawing Sheets

U.S. PATENT DOCUMENTS

| | | | |
|---|---|---|---|
| 3,524,309 A * | 8/1970 | Bartlett | 56/249 |
| 3,628,318 A * | 12/1971 | Grobowski | 56/249 |
| 3,680,293 A * | 8/1972 | Klemenhagen | 56/249 |
| 3,759,022 A * | 9/1973 | Snyder et al. | 56/252 |
| 3,807,151 A * | 4/1974 | Rosenthal et al. | 56/16.9 |
| 3,918,239 A * | 11/1975 | Aldred et al. | 56/7 |
| 3,977,163 A | 8/1976 | Olin et al. | |
| 3,992,859 A * | 11/1976 | Rubin | 56/17.2 |
| 4,006,580 A | 2/1977 | Kalleicher | |
| 4,441,306 A | 4/1984 | Kuhn | |
| 4,481,757 A * | 11/1984 | Tsuchiya | 56/16.9 |
| 4,577,455 A | 3/1986 | Amano et al. | |
| 4,835,952 A | 6/1989 | McLane | |
| 4,878,340 A * | 11/1989 | Roy et al. | 56/249 |
| 5,031,335 A | 7/1991 | Kimmelman | |
| 5,085,044 A | 2/1992 | Freier, Jr. et al. | |
| 5,161,353 A | 11/1992 | Bergkamp et al. | |
| 5,203,151 A | 4/1993 | Mills | |
| 5,241,810 A | 9/1993 | Reichen | |
| 5,259,175 A | 11/1993 | Schmidt | |
| 5,261,213 A | 11/1993 | Humphrey | |
| 5,351,467 A * | 10/1994 | Trefz et al. | 56/16.3 |
| 5,624,214 A | 4/1997 | Carroll | |
| 5,661,959 A * | 9/1997 | Vargas | 56/7 |
| 5,797,252 A * | 8/1998 | Goman | 56/17.2 |
| 6,073,357 A | 6/2000 | Kosmalski | |
| 6,206,393 B1 | 3/2001 | Mascari et al. | |
| 6,276,119 B1 * | 8/2001 | Oshima et al. | 56/17.1 |
| 6,467,245 B1 | 10/2002 | Humphrey | |
| 6,484,359 B1 | 11/2002 | Guttmann et al. | |
| 6,651,415 B2 * | 11/2003 | Burke | 56/17.2 |
| 6,732,500 B1 | 5/2004 | Myers | |
| 6,868,658 B2 | 3/2005 | Velke et al. | |
| 7,114,318 B2 * | 10/2006 | Poulson et al. | 56/249 |
| 7,624,560 B1 * | 12/2009 | Humphrey | 56/17.2 |
| 2003/0140611 A1 | 7/2003 | Burke | |
| 2004/0093840 A1 | 5/2004 | Velke et al. | |
| 2010/0146923 A1 * | 6/2010 | Hallale | 56/249 |

FOREIGN PATENT DOCUMENTS

| | | |
|---|---|---|
| CA | 2104570 | 2/1995 |
| CA | 2192224 | 11/1997 |
| DE | 29502274 | 6/1995 |
| EP | 0111725 A | 6/1984 |
| EP | 0355365 | 2/1990 |
| EP | 1474962 A1 | 11/2004 |
| EP | 1495661 | 1/2005 |
| GB | 520582 | 4/1940 |
| GB | 1164603 A | 9/1969 |
| GB | 1180381 | 2/1970 |
| GB | 2082036 | 3/1982 |
| GB | 2147185 | 5/1985 |
| GB | 2337914 | 12/1999 |
| GB | 2427992 | 1/2007 |
| JP | 09065744 | 3/1997 |
| JP | 10178859 | 7/1998 |
| WO | 91/03927 | 4/1991 |
| WO | 92/12352 | 7/1992 |

* cited by examiner

HEIGHT ADJUSTER MECHANISM FOR A GRASS/GROUND TREATMENT MACHINE

This invention relates to a height adjuster mechanism for a grass/ground treatment machine.

Typical machines with which the invention may be used comprise grass mowing machines e.g. for use in maintaining golf courses, and ground treatment machines also for use in the same environment, in which the mower unit (cassette or module) of the mowing machine is replaced by a ground treatment unit, such as a scarifier, aerator or spiker.

A grass/ground treatment machine usually has a front ground-engaging roller which is adjustably mounted on the frame of the machine so as to set any required height above the ground of the axis of rotation of the treatment unit which may be required. Evidently, downward adjustment of the roller assembly relative to the frame will raise the height of the treatment unit, and conversely upward adjustment of the roller assembly will lower the treatment unit.

It is known to provide separate height adjuster units at each end of the roller assembly, and usually some form of reference lines or other indications are provided, to indicate different height settings. It is important that the indications should be clearly visible, so that uniform height adjustment can take place at each end of the roller assembly. Clearly, unequal adjustment will have an adverse effect on the quality of the grass/ground treatment carried out by the treatment module.

However, given the grassy environment in which these machines operate, indicator lines or other markings quickly become obscured by build-up of dirt, dried grass etc., and this makes any required subsequent adjustment difficult to carry out accurately, without first carrying out major cleaning of all indicator surfaces.

The present invention has been developed primarily with a view to provide a novel height adjuster mechanism in which accurate adjustments can be made without necessarily relying upon visual observation of height indicator settings.

According to the invention there is provided a height adjuster mechanism for mounting on a frame of a grass and/or ground treatment machine, and connectable to a ground-engaging roller assembly of the machine, in which the mechanism is adjustable in order to vary the height of the frame relative to the roller assembly and thereby adjust the height setting of a grass or ground treatment module mounted on the frame, and the mechanism comprising:

an elongate height adjuster connectable at a lower end to the roller assembly, and which is intended to be mounted on the frame to carry out up and down movement lengthwise of its axis in order to adjust the height setting of the treatment module;

an external thread provided on at least part of the elongate adjuster;

a rotary adjuster having an internally threaded socket portion rotatably mounted on the external thread of the elongate height adjuster, such that rotation of the rotary adjuster can cause lengthwise adjustment of the elongate adjuster;

an open-topped housing provided on the rotary adjuster and having an upper surface which defines a height adjustment reference datum level;

an insert mounted on the upper end of the elongate adjuster and which is movable up and down within the open-topped housing as a consequence of lengthwise adjustment of the elongate adjuster, and in which the upper surface of the insert can be adjusted to be substantially flush or coplanar with the upper surface of the open-topped housing so as to set a datum level of the treatment module; and means for determining the extent of angular adjustment of the rotary adjuster from its position corresponding to the datum level position of the insert, so as to set any required height adjustment of the treatment module.

Therefore, in a height adjuster mechanism according to the invention, the datum level of the treatment module can first be set quite simply, by adjustment of the rotary adjuster to bring the upper surface of the insert to be flush with i.e. generally coplanar with the datum level provided by the upper surface of the open-topped housing. The completion of this adjustment can be determined quite easily, without relying necessarily upon indicator lines or markings, by simple observation of the insert and/or finger touch of the insert and the housing.

This then sets the datum level, which for a newly installed unworn module may be one in which the working elements of the module just touch the ground e.g. the blades of a cylinder mower unit just touch the ground.

Thereafter, the rotary adjuster can be rotated, to raise or lower the height of the module as required, and the extent of angular adjustment can be monitored to provide any required height adjustment from the datum level.

Any convenient means may be provided, to determine the extent of angular adjustment. Although not shown in detail, a spring-loaded detent 25 may be arranged to provide an audible and/or physical movement easily determined by feel, and indicative of a predetermined amount of angular adjustment of the rotary adjuster 16 from the datum level position of the insert 20. By way of example, two "clicks" could correspond to one complete rotation of the rotary adjuster 16.

However, other means of determining the extent of angular adjustment may be provided e.g. a reference mark, indicator, or protrusion on the outer surface of the rotary adjuster 16, whose angular adjustment from the datum position can easily be monitored e.g. per complete revolution of the rotary adjuster 16.

Conveniently, the insert may carry reference lines indicative of the extent of height adjustment, and which will be visible as the insert projects upwardly from the datum level set by the upper surface of the housing.

Preferably, the insert is adjustably mounted on the upper end of the elongate adjuster, so that different datum levels can be set to correspond to a particular treatment module. Evidently, over time wear of the working elements may require a lower height of the axis of the module at the datum level, and this can be obtained by simple height adjustment of the insert relative to the elongate adjuster.

To provide a universal type of insert to suit a machine designed to mount different types of treatment module e.g. mower units, scarifiers, and verti-cutters, each having a requirement for a different datum level, the insert may be stepped, and with each step, when adjusted to be flush with the reference datum level, corresponding to a particular treatment module.

A preferred embodiment of height adjuster mechanism according to the invention will now be described in detail, by way of example only, with reference to the accompanying drawings, in which.

Figure 2:
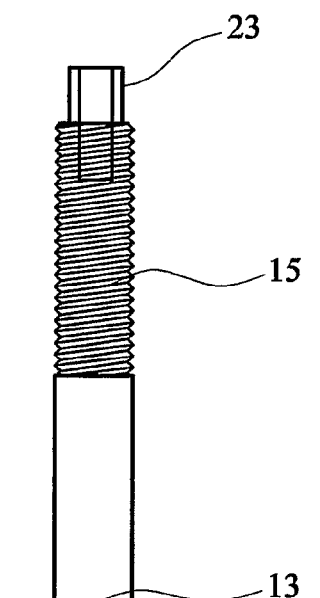
FIG. 2 is a side view of a rotary adjuster of the mechanism.
Figure 4:
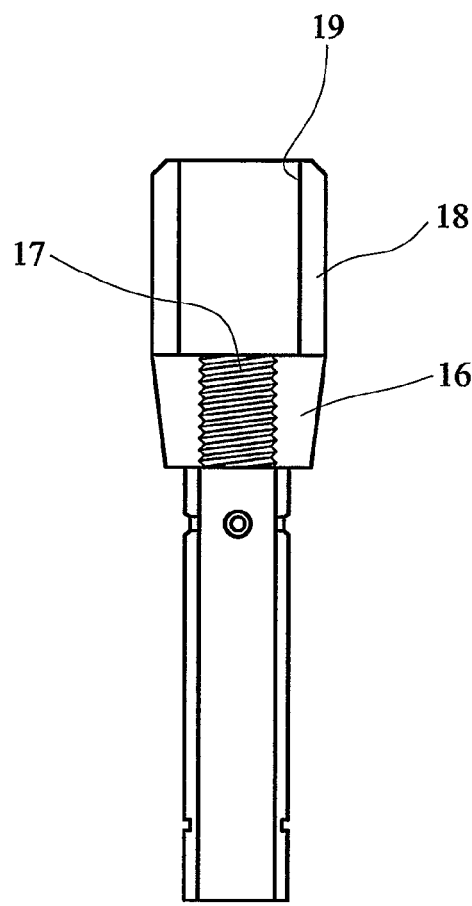
Figure 3:
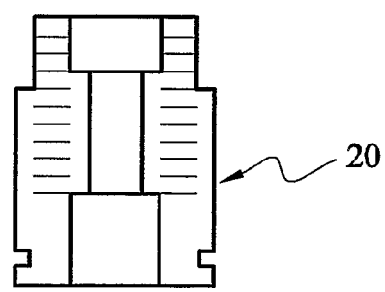

FIG. 3 is a detail view of an insert which is adapted to be mounted for up and down slidable movement in an upper housing of the rotary adjuster shown in FIG. 2; and FIG. 4 is a side view of an elongate adjuster member of the mechanism connected at its lower end to a ground engaging roller assembly of the machine, and which is adjustable up and down lengthwise of its axis in order to vary the height of the frame of the machine relative to the roller assembly.

Referring now to the drawings, a height adjuster mechanism according to the invention is designated generally by reference 10 and is intended to be mounted on a frame of a grass and/or ground treatment machine (not shown). Part of the frame of the machine is shown by reference 11, and adjustment of the mechanism 10 can cause height adjustment to take place between the frame 11 and a ground-engaging roller assembly (not shown in detail) of the machine, and which has a mounting 12 connected to a lower end of the mechanism.

Figure 1:
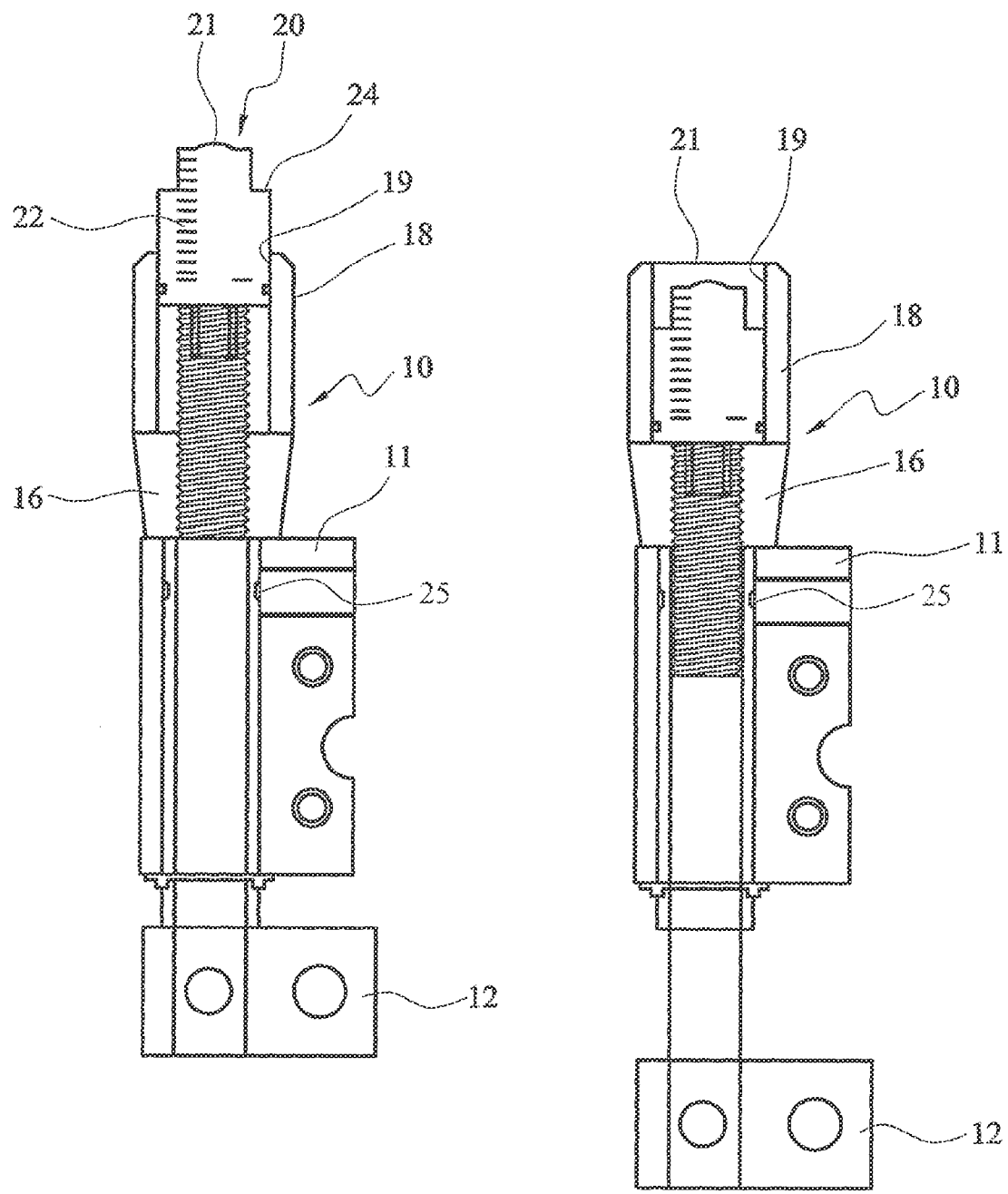
FIG. 1 shows two different positions of height adjustment of a height adjuster mechanism according to the invention for mounting on the frame of a grass and/or ground treatment machine.

The left hand illustration in FIG. 1 shows a lowest position of height adjustment of the treatment module (not shown) relative to the ground, and the right hand illustration shows maximum height adjustment of the treatment module, whereby the height of the frame 11 relative to the roller assembly is at a maximum.

The mechanism comprises an elongate height adjuster 13 connectable at its lower end 14 to the roller assembly, and which is mounted on the frame 11 to carry out up and down movement lengthwise of its axis in order to adjust the height setting of the treatment module.

An external thread 15 is provided on at least part of the overall length of the elongate adjust 13.

A rotary adjuster 16 has an internally threaded socket portion 17 which is rotatably mounted on the external thread 15 of the elongate height adjuster 13, such that rotation of the rotary adjuster 16 can cause lengthwise adjustment of the elongate adjuster 13.

An open-topped housing 18 is provided on the rotary adjuster 16 and has an upper surface 19 which defines a height adjustment reference datum level.

An insert 20 is adjustably mounted on the upper end of the elongate adjuster 13 and is movable up and down within the open-topped housing 18 as a consequence of lengthwise adjustment of the elongate adjuster 13.

The upper surface 21 of the insert 20 can be adjusted to be substantially flush or coplanar with the upper surface 19 of the open-topped housing 18, so as to set a datum level of the treatment module.

Means is provided to enable determination of the extent of angular adjustment of the rotary adjuster 16 from its position corresponding to the datum level position of the insert 20, so as to set any required height adjustment of the treatment module.

Thus, the datum level of the treatment module can first be set quite simply, by adjustment of the rotary adjuster 16 to bring the upper surface 21 of the insert 20 to be coplanar with the datum level provided by the upper surface 19 of the open-topped housing 18. The completion of this adjustment can then be determined quite easily, without relying necessarily upon indicator lines or markings, by simple observation of the insert and/or by finger touch of the insert and the housing. This then sets the datum level, which for a newly installed unworn module may be one in which the working elements of the module e.g. the blades of a cylinder mower unit, just touch the ground.

Thereafter, the rotary adjuster 16 can be rotated, to raise or lower the height of the module as required, and the extent of angular adjustment can be monitored to provide any required height adjustment from the datum level e.g. up or down.

Any convenient means may be provided, to determine the extent of angular adjustment. Although not shown in detail, a spring-loaded detent may be arranged to provide an audible and/or physical movement easily determined by feel, and indicative of a predetermined amount of angular adjustment of the rotary adjuster 16 from the datum level position of the insert 20. By way of example, two "clicks" could correspond to one complete rotation of the rotary adjuster 16.

However, other means of determining the extent of angular adjustment may be provided e.g. a reference mark, indicator, or protrusion on the outer surface of the rotary adjuster (not shown), whose angular adjustment from the datum position can easily be monitored e.g. per complete revolution of the rotary adjuster.

The insert 20 may have reference lines 22 indicative of the extent of height adjustment, and which will become visible as the insert 20 projects upwardly from the datum level set by the upper surface 19 of the housing 18.

The insert 20 is adjustably mounted on the upper end 23 of the elongate adjuster 13, so that different datum levels can be set to correspond to a particular treatment module. Evidently, over time wear of the working elements may require a lower height of the axis of the module at the datum level, and this can be obtained by simple height adjustment of the insert 20 relative to the elongate adjuster 13.

To provide a universal type of insert to suit a machine designed to mount different types of treatment module e.g. mower units, scarifiers and verti-cutters, each having a requirement for a different datum level, the insert 20 may be stepped, as shown, and with each step, when adjusted to be flush with the reference datum level, corresponding to a particular treatment module.

In the illustrated example, insert 20 has a top "step" as shown by reference 21, and which will correspond to one type of treatment module, and a lower step 24 corresponding to a different treatment module. If required, further steps may be provided, although these are not shown in the drawing. The preferred embodiment disclosed herein therefore provides the following adjustment features and advantages:

1. A height of cut indicator mechanism is provided, which, when a step line is flush with the datum level surface, can show a zero height of cut setting:

2. If a second or multiplicity of steps are provided, this allows the operator to set at zero other grass treatment modules or cassettes of different diameter without need for visual observation of indications or markings; simply, a finger can be slid over the step to check that it is level with the top of the housing;

3. To allow for grass treatment module wear, the stepped insert is adjustable e.g. threaded, so as to be always able to set at zero a module with worn blades;

4. The insert may have other marks or dents or grooves which may be spaced at regular intervals, so as to be able to be observed visually, or by feel to detect increased or decreased HOC settings above or below zero e.g. for when mowing grass above zero or verti-cutting grass below zero;

5. By changing the spacing of any additional grooves, steps or markings, it is possible to have imperial or metric settings simply by changing the insert;

6. Steps on the insert may be full circle, square, half circle or any other full or part shape; and 7. Also, from the level zero position, by turning the rotary adjuster, "clicks or dimples" may be introduced, thereby giving the ability to set HOC by a pre-known amount of turns or "clicks" to a new given HOC, without viewing a gauge at all, eliminating the problem of dirty and often corroded HOC lines, marks or other numbers or indications normally provided in known mechanism.

The invention claimed is:

1. A height adjuster mechanism for mounting on a frame of a ground treatment machine, and connectable to a ground-engaging roller assembly of the machine, in which the mechanism is adjustable in order to vary the height of the frame relative to the roller assembly and thereby adjust the height setting of different types of ground treatment modules mounted on the frame, and the mechanism comprising:

an elongate height adjuster connectable at a lower end to the roller assembly, and which is mounted on the frame to carry out up and down movement lengthwise of an axis of the elongate height adjuster in order to adjust the height setting of a particular treatment module of the different types of treatment modules;

an external thread provided on at least part of the elongate adjuster;

a rotary adjuster having an internally threaded socket portion rotatably mounted on the external thread of the elongate height adjuster, such that rotation of the rotary adjuster can cause lengthwise adjustment of the elongate adjuster;

an open-topped housing provided on the rotary adjuster and having an upper surface which defines a height adjustment reference datum level;

an insert mounted on the upper end of the elongate adjuster and which is movable up and down within the open-topped housing as a consequence of lengthwise adjustment of the elongate adjuster, and in which the upper surface of the insert can be adjusted to be substantially flush or coplanar with an upper surface of the open-topped housing so as to set a datum level of a particular treatment module of the different types of treatment modules and, wherein the insert is stepped for determining the extent of angular adjustment of the rotary adjuster from the datum level position; and wherein the different types of ground treatment module each have a requirement for a different datum level, such that each step, when adjusted to be flush with the reference datum level, provides a required height adjustment corresponding to each particular treatment module.

2. A mechanism according to claim 1, in which a spring-loaded detent is arranged to provide a physical movement easily determined by feel, and indicative of a predetermined amount of angular adjustment of the rotary adjuster.

3. A mechanism according to claim 2, in which the insert carries reference lines indicative of the extent of height adjustment, and visible as the insert projects upwardly from the datum level set by the upper surface of the housing.

4. A ground treatment machine having a height adjuster mechanism according to claim 2 wherein the roller assembly has a first end and a second end and the height adjuster mechanism is provided at the first and second ends of the roller assembly.

5. A mechanism according to anyone of claim 1, in which the insert carries reference lines indicative of the extent of height adjustment, and visible as the insert projects upwardly from the datum level set by the upper surface of the housing.

6. A ground treatment machine having a height adjuster mechanism according to claim 5 wherein the roller assembly has a first end and a second end and the height adjuster mechanism is provided at the first and second ends of the roller assembly.

7. A ground treatment machine having a height adjuster mechanism according to claim 1 wherein the roller assembly has a first end and a second end and the height adjuster mechanism is provided at the first and second ends of the roller assembly.

8. A mechanism according to claim 1, in which a spring-loaded detent is arranged to provide an audible movement indicative of a predetermined amount of angular adjustment of the rotary adjuster.

* * * * *